Jan. 9, 1934.  C. P. McNEIL  1,942,656
ASPHALT FROM BLOWN PETROLEUM RESIDUUMS
Filed Dec. 9, 1929
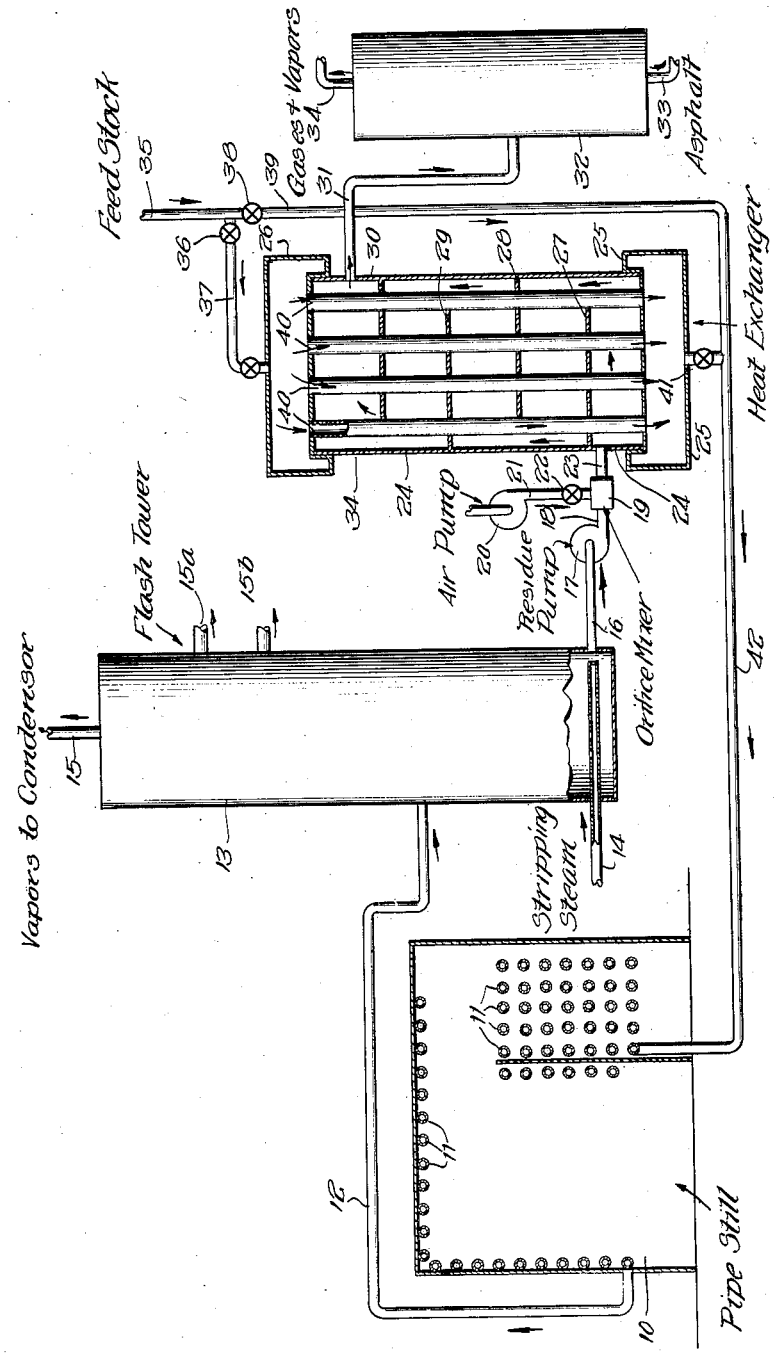
Witness
William P. Milroy
Inventor
Claude P. McNeil
By Bruce K. Brown Atty.

Patented Jan. 9, 1934

1,942,656

UNITED STATES PATENT OFFICE 1,942,656

ASPHALT FROM BLOWN PETROLEUM RESIDUUMS

Claude P. McNeil, Whiting, Ind., assignor to The Standard Oil Company, Chicago, Ill., a corporation of Indiana Application December 9, 1929. Serial No. 412,625

2 Claims. (Cl. 196—74)

This invention relates to preparation of air blown asphalts and it pertains more particularly to the production of asphalts by blowing petroleum residuums from pipe stills or other continuous distillation systems.

The object of my invention is to provide a process wherein the heat of reaction of the oxygen and the petroleum residuum is not only utilized to maintain the reaction temperature but to preheat fresh charging stock.

A further object is to provide an improved means for controlling the temperature of the reaction chamber by regulating the amount of charging stock fed in heat exchange relation thereto.

A further object is to simplify the apparatus and process for making air blown asphalt in continuous petroleum distillation systems.

Other objects will be apparent as the detailed description of my invention proceeds.

The invention may be briefly described as a system in which the hot residuum from a pipe still is mixed with air prior to its introduction to the reaction chamber, and in which the reaction chamber is a heat exchanger through which regulated quantities of charging stock are passed. The reaction temperature is thus regulated to produce asphalt of desired characteristics and at the same time the charging stock is preheated.

The accompanying drawing shows diagrammatically an arrangement of apparatus suitable for practicing my invention.

In the pipe still 10, petroleum is rapidly passed through pipes 11 arranged to utilize the furnace heat both by convection and radiation according to present day practice. The construction and arrangement of the pipe still form no part of my invention and these elements will not be described in detail.

Hot oil from the pipe still is conducted by insulated conduit 12 to a flash tower 13. This tower may be provided with suitable dephlegmating plates in its upper portion for fractionating the volatile constituents and it may be provided with suitable baffle plates in its base to aid the steam which is supplied through conduit 14, in stripping the residuum and liberating all low boiling point constituents. The flash tower per se forms no part of my invention and it will not be described in detail.

Steam and non-condensible vapors may be removed from the flash tower through vapor line 15. Oil fractions may be removed from the fractionating portion of the tower at various levels through pipes 15A, 15B, etc. The hot residuum is removed from the base of the tower through pipe 16.

This hot residuum is forced by pump 17 through a pipe 18 to an air mixer 19. An air pump 20 forces air through pipe 21 in quantities regulated by valve 22 to the air mixer 19 where the hot residuum and air are intimately mixed. The intimate mixture is discharged through a short conduit 23 into the reaction chamber 24 which in the present invention is designed as a heat exchanger.

The ends of the cylindrical reaction chamber 24 are closed by headers 25 and 26. Baffle plates 27, 28, 29 and 30 cause the reacting mixture to take a circuitous path through the reaction chamber. This insures contact of the mixture with the cooling means as will be hereinafter described and it also prevents the formation of air pockets and maintains the mixture in a uniformly divided condition.

The mixture leaves the reaction chamber through pipe 31 by which it is delivered to separator 32, the asphalt being drawn from the base of the separator through pipe 33, the gases and vapors being removed through conduit 34.

The feed stock from pipe 35 may be by-passed through valve 36 and pipe 37 to the reaction chamber or may be passed around said reaction chamber through valve 38 and pipe 39. In the former case the oil will be delivered by pipe 37 to header 26 and distributed in pipes 40 in heat exchange relation to the reacting mixture of air and hot residuum. After passing through pipes 40 and header 25 the oil is discharged through valved pipe 41 to pipe 42 which is in effect a continuation of pipe 39. Pipe 42 discharges preheated oil into the pipe still 10.

The operation of my invention will be apparent from the above description. Petroleum having an asphaltic content is introduced through pipe 35 through or around preheater-reaction chamber 24 into pipe still 10 where it is heated to a temperature of about 750 to 800° F. The oil is flashed in tower 13 wherein all volatile fuel oils, lubricating oils and waxes are removed and fractionated, superheated steam being introduced at the base of the tower to strip the residuum of all volatile constituents.

The hot residuum at a temperature of about 450° F. is intimately mixed with air in mixer 19 and immediately discharged into reaction chamber 24.

The heat of reaction maintains a temperature high enough to convert the residuum to an asphalt. At high initial temperatures (about 500° F.) and/or with large amounts of air (more than 15 to 20 cu. ft. per gal. of residuum), the temperature in the reaction chamber may become abnormally high. Heretofore this temperature has been regulated by diminishing the air supply or by cooling the chamber. However, by properly regulating valves 36, 38 and 41, I obtain accurate temperature control while using large amounts of air and at the same time I utilize the excess heat of reaction in preheating fresh charging stock.

It is understood that while I have set forth a preferred embodiment of my invention I do not limit myself to these details but I contemplate the use of any and all expedients known to those skilled in this art.

For instance, I contemplate the use of insulation on the surfaces of pipes or tanks exposed to the air, I contemplate the use of air jets or other means in the reaction chamber to keep the mixture of hot residuum and air from separating or becoming stagnant, and I contemplate the addition of oxygen (air) in the reaction chamber if that furnished by the mixer is insufficient.

I claim:

1. In apparatus for preparing blown asphalt, a pipe still, a flash tower, means for intimately mixing air and residuum, a reaction chamber, means for passing oil from the pipe still to the flash tower, means for passing residuum from the tower to the mixing means, means for passing the mixture of air and residuum from the mixing means to the reaction chamber, and means for passing feed stock for the pipe still through said reaction chamber in indirect heat exchange relation to the air-residuum mixture whereby the reaction temperature is controlled and charging stock is preheated prior to its introduction into the pipe still.

2. The method of preparing blown asphalt from petroleum which contains asphaltic components, which method comprises distilling said petroleum in a distillation zone to separate overhead fractions and to produce a hot residuum, continuously mixing air with the hot residuum, continuously passing the mixture through a reaction zone wherein heat is liberated by the exothermic reaction of the air with the hot residuum, absorbing at least a part of the liberated heat by passing petroleum in heat exchange relation to said reaction zone whereby the petroleum is heated and the temperature of the air-residuum mixture is controlled, and passing the heated petroleum to the distillation zone whereby the heat which it has absorbed from the air-residuum mixture may be utilized.

CLAUDE P. McNEIL.